United States Patent
Wade et al.

(10) Patent No.: US 9,643,353 B2
(45) Date of Patent: May 9, 2017

(54) MILL-STYLE BLOW MOLDING WHEEL MECHANISM AND METHOD OF MANUFACTURING USING THE SAME

(71) Applicant: MeadWestvaco Corporation, Richmond, VA (US)

(72) Inventors: Michael P. Wade, Chesterfield, VA (US); Barry G. Calvert, Covington, VA (US)

(73) Assignee: WestRock MWV, LLC, Norcross, GA (US)

( * ) Notice: Subject to any disclaimer, the term of this patent is extended or adjusted under 35 U.S.C. 154(b) by 0 days.

(21) Appl. No.: 14/715,655

(22) Filed: May 19, 2015

(65) Prior Publication Data

US 2015/0328822 A1    Nov. 19, 2015

Related U.S. Application Data

(60) Provisional application No. 62/000,261, filed on May 19, 2014.

(51) Int. Cl.

| | |
|---|---|
| *B29C 49/36* | (2006.01) |
| *B29C 49/20* | (2006.01) |
| *B29C 33/12* | (2006.01) |
| *B29C 33/22* | (2006.01) |
| *B29C 33/36* | (2006.01) |
| *B31D 5/02* | (2017.01) |
| *B29L 31/00* | (2006.01) |
| *B29C 49/04* | (2006.01) |
| *B29C 49/22* | (2006.01) |
| *B29C 49/70* | (2006.01) |

(Continued)

(52) U.S. Cl.
CPC .............. *B29C 49/36* (2013.01); *B29C 33/12* (2013.01); *B29C 33/22* (2013.01); *B29C 33/36* (2013.01); *B31D 5/02* (2013.01); *B29C 49/04* (2013.01); *B29C 49/20* (2013.01); *B29C 49/22* (2013.01); *B29C 49/70* (2013.01); *B29C 2049/2017* (2013.01); *B29C 2049/2069* (2013.01); *B29C 2049/2073* (2013.01); *B29C 2049/2402* (2013.01); *B29C 2049/4869* (2013.01); *B29C 2049/702* (2013.01); *B29L 2031/712* (2013.01); *B31B 2201/22* (2013.01)

(58) Field of Classification Search
CPC ........................ B29C 49/36; B29C 2049/2017
USPC ........................................................ 425/540
See application file for complete search history.

(56) References Cited

U.S. PATENT DOCUMENTS 3,025,561 A * 3/1962 Simon ..................... B29C 49/36
                                                          425/444
3,390,430 A * 7/1968 Lynch ..................... B29C 47/22
                                                          264/541

(Continued)

*Primary Examiner* — Robert B Davis
(74) *Attorney, Agent, or Firm* — WestRock IP Legal

(57) ABSTRACT

In one embodiment, an apparatus and a method of manufacturing a paperboard tray therewith is provided. In particular, a hub is configured to rotate about a shaft. On the hub, a plurality of first molds are formed in the hub. Conversely, a plurality of second molds are each disposed above each of the plurality of first molds respectively and rotate above the first molds. In this configuration, the plurality of second molds are configured to move in unison with the plurality of first molds as the hub and second molds rotate and to move orthogonally towards and then away from the first molds as the second molds rotate.

16 Claims, 6 Drawing Sheets

(51) Int. Cl.
    *B29C 49/24*          (2006.01)
    *B29C 49/48*          (2006.01)

(56) References Cited

U.S. PATENT DOCUMENTS

| | | | | |
|---|---|---|---|---|
| 3,843,305 A | * | 10/1974 | Doughty | B29C 47/26 |
| | | | | 425/381 |
| 4,007,244 A | * | 2/1977 | Avery | B29C 49/36 |
| | | | | 264/150 |
| 4,041,124 A | * | 8/1977 | Seelye | B29C 49/4205 |
| | | | | 198/411 |
| 4,197,071 A | * | 4/1980 | Salle | B29C 49/42 |
| | | | | 264/40.7 |
| 5,068,065 A | * | 11/1991 | Maus | B29C 45/263 |
| | | | | 264/1.33 |
| 5,169,470 A | * | 12/1992 | Goldberg | B29C 51/267 |
| | | | | 156/244.14 |
| 5,645,870 A | * | 7/1997 | Larsen | B29C 49/36 |
| | | | | 264/543 |
| 6,089,854 A | * | 7/2000 | Outreman | B29C 49/48 |
| | | | | 425/437 |

\* cited by examiner

MILL-STYLE BLOW MOLDING WHEEL MECHANISM AND METHOD OF MANUFACTURING USING THE SAME

CROSS-REFERENCE TO RELATED APPLICATIONS

This application claims the benefit of U.S. Provisional Application No. 62/000,261, entitled "MILL-STYLE BLOW MOLDING WHEEL MECHANISM AND METHOD OF MANUFACTURING USING THE SAME," filed 19 May 2014, and incorporates the same herein by reference in its entirety.

BACKGROUND OF THE INVENTION

Field of the Invention

The present disclosure relates generally to a mill-style blow molding mechanism and a method for operating the same. More specifically, the present disclosure relates to a mill-style blow molding mechanism for blow molding paperboard packaging.

State of the Art

Blow molding has become an integral part of manufacturing plastic containers in the past few decades. In order to efficiently produce product in this industry, different methods or techniques have been utilized by manufactures. One of these methods is a rotary wheel blow molding systems which are typically used for the high-output production of a wide variety of plastic extrusion blow molded articles.

In conventional systems, these rotary wheels contain upwards of thirty molds depending on the size and features of the containers they are producing, and often feature continuously extruded parisons. Revolving sets of blow molds capture the parison or parisons as they pass over the extrusion head. Once the blow molds capture the parison or parisons, the molds are closed or sealed with some form of clamping force. Typically, these molds open and close horizontally thereby limiting the shape and size of the wheels and location and access to other manufacturing equipment that is utilized for the manufacturing process. In such configurations, the molds generally slide open and closed and thus take up a significant amount more space and are more cumbersome to operate. Additionally, these sliding mechanisms typically dictate that the shape of the blow mold must be trapezoidal rather than square. Trapezoidal shaped containers, however, increase the amount of plastic waste that is produced by the process between blow molded parts because of the gaps formed between the upper and lower corners. Therefore, there is a need for a blow molding wheel that is more efficient and can accept rectangular-shaped or rounded shaped three-dimensional parts to reduce the amount of plastic waste in the process and increase the overall efficiency

BRIEF SUMMARY OF THE INVENTION

In one embodiment, an apparatus and a method of manufacturing a paperboard tray therewith is provided. In particular, a hub is configured to rotate about a shaft. On the hub, a plurality of first molds are formed on an outer circumference thereof. Conversely, a plurality of second molds are each disposed above each of the plurality of first molds respectively and rotate above the first molds. In this configuration, the plurality of second molds are configured to move in unison with the plurality of first molds as the hub and second molds rotate and to move orthogonally towards and then away from the first molds as the second molds rotate.

In another embodiment of the present invention, a method for manufacturing one or more three-dimensional parts utilizing the above described mill-style blow molding wheel is provided. In particular, one or more three-dimensional parts are fed into a first mold on an outer circumference of a hub and a second mold in the same axial direction as the hub above the first molds. The first mold and the second mold, including the one or more three-dimensional parts, are then rotated toward an extruder and a material is extruded onto the one or more three-dimensional parts that are disposed in the first mold and second mold. After extrusion, the second mold is orthogonally moved toward the first mold after the material has been extruded onto the one or more three-dimensional parts to force the first mold and the second mold to come in contact as the first and second molds rotate. The first and second molds are then rotated a particular distance respectively at which time a blow molding process may be applied therein. In response to rotating a particular distance, the second mold orthogonally moves away from the first mold (due to the rotation of the second mold) and removes the one or more three-dimensional parts from the first mold as a result (e.g., by applying a suction force to the one or more three-dimensional parts).

Additionally, in some exemplary embodiments of the present invention, suction may be applied to the three-dimensional part by at least one suction mechanism in the second mold to remove the one or more three-dimensional parts from the first molds once the blow molding process has been completed.

Advantageously, the above mentioned mill-style blow molding wheel increases the accessibility to the molds for insertion and extraction of the three-dimensional parts while at the same time increasing the overall speed of the production process (e.g., 288 parts/min may be produced). Additionally, by utilizing the mill-style molds which open and close orthogonally, the molds may be rectangular or rounded, thereby reducing plastic waste between blow molded parts.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION OF THE INVENTION

Figure 1:
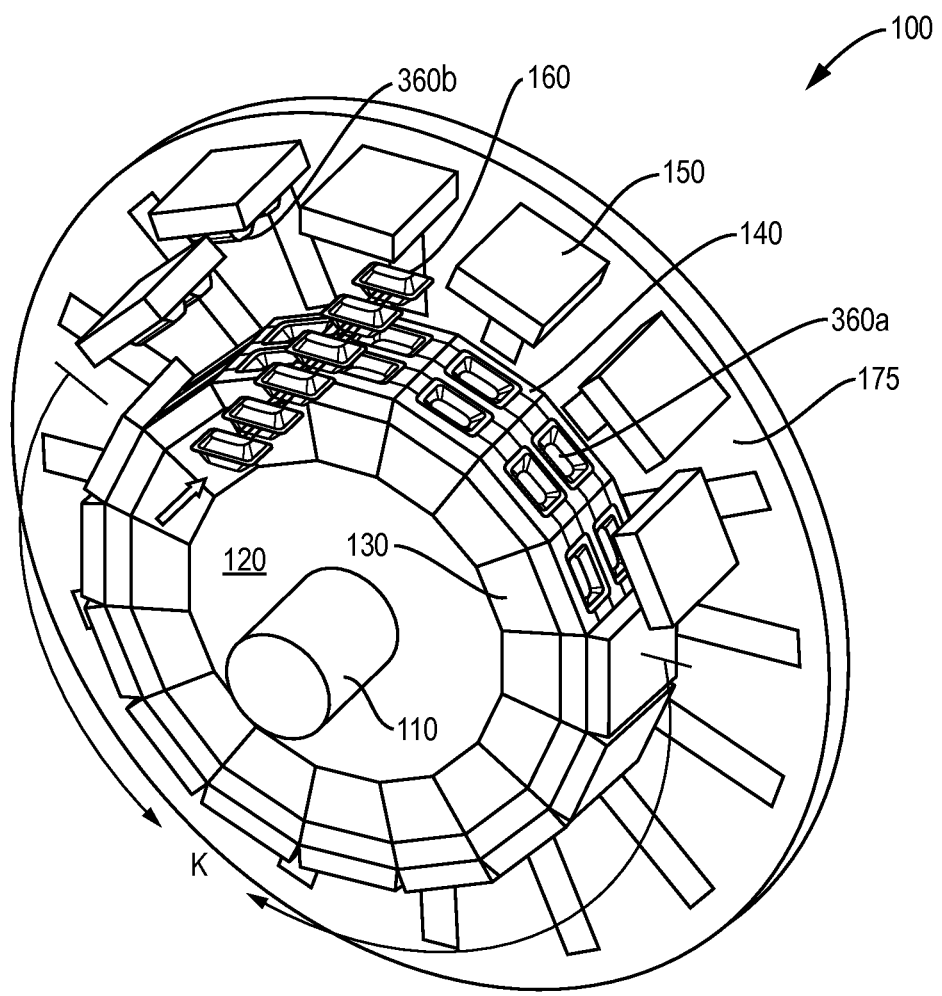
FIG. 1 illustrates an example perspective right side view of the mill-style blow molding wheel.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Additionally, the term rectangular is referred to herein as included all shapes with four sides including square. Likewise, the term rounded is referred to herein to include all shapes up to and including, a sphere, an egg-shape, etc.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

As stated above, rotary wheel blow molding systems currently include molds that open and close horizontally via a sliding mechanism which hinders the efficiency of the blow molding process by denying access for insertion and extraction of the parts into the molds. This often results in a reduced speed at which the wheel can produce product. Additionally, these horizontally displaced molds often dictate the shape of the parts that can be placed in the molds (e.g., often requiring trapezoidal shaped molds rather than square or rectangular and rounded/spherical shaped molds).

Mill-Style Blow Molding Wheel

The techniques described herein are described as being utilized with packaging containers, however, the illustrative mill-style blow molding wheel is not limited to this use and may alternatively be used for blow molding any three-dimensional part. Again, advantageously, the above mentioned mill-style blow molding wheel increases the accessibility to the molds for insertion and extraction of the three-dimensional parts while at the same time increasing the overall speed of the production process (e.g., 288 parts/min may be produced). Additionally, by utilizing the mill-style molds which open and close orthogonally, the molds may be rectangular or spherical/rounded, thereby reducing plastic waste between blow molded parts.

In one embodiment, an apparatus and a method of manufacturing a paperboard tray therewith is provided. In particular, a hub is configured to rotate about a shaft. On the hub, a plurality of first molds are formed on an outer circumference thereof. Conversely, a plurality of second molds are each disposed above each of the plurality of first molds respectively and rotate above the first molds. In this configuration, the plurality of second molds are configured to move in unison with the plurality of first molds as the hub and second molds rotate and to move orthogonally towards and then away from the first molds as the second molds rotate.

Figure 2:
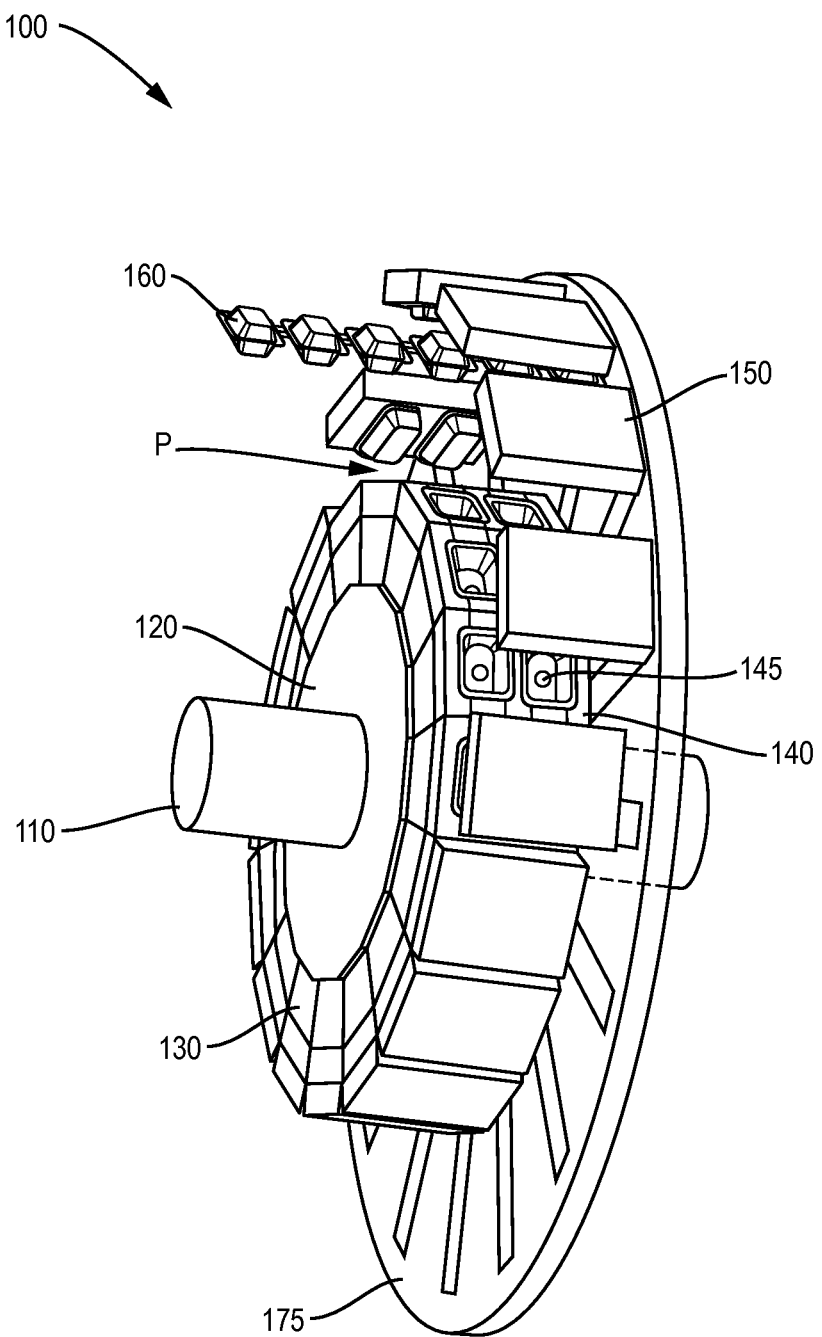
FIG. 2 illustrates an example perspective right side view of the mill-style blow molding wheel.
Figure 3:
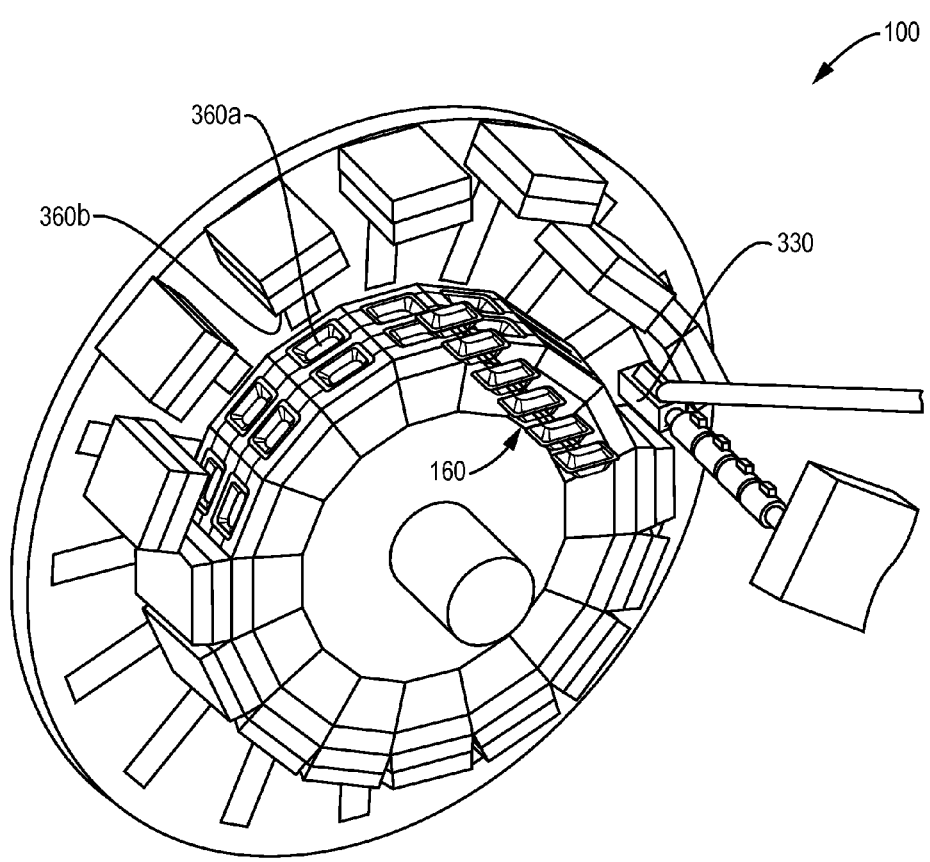
FIG. 3 illustrates an example perspective view of the mill-style blow molding wheel implemented in a paperboard blow molding manufacturing assembly illustrating the positioning of an extruder.
Figure 4:
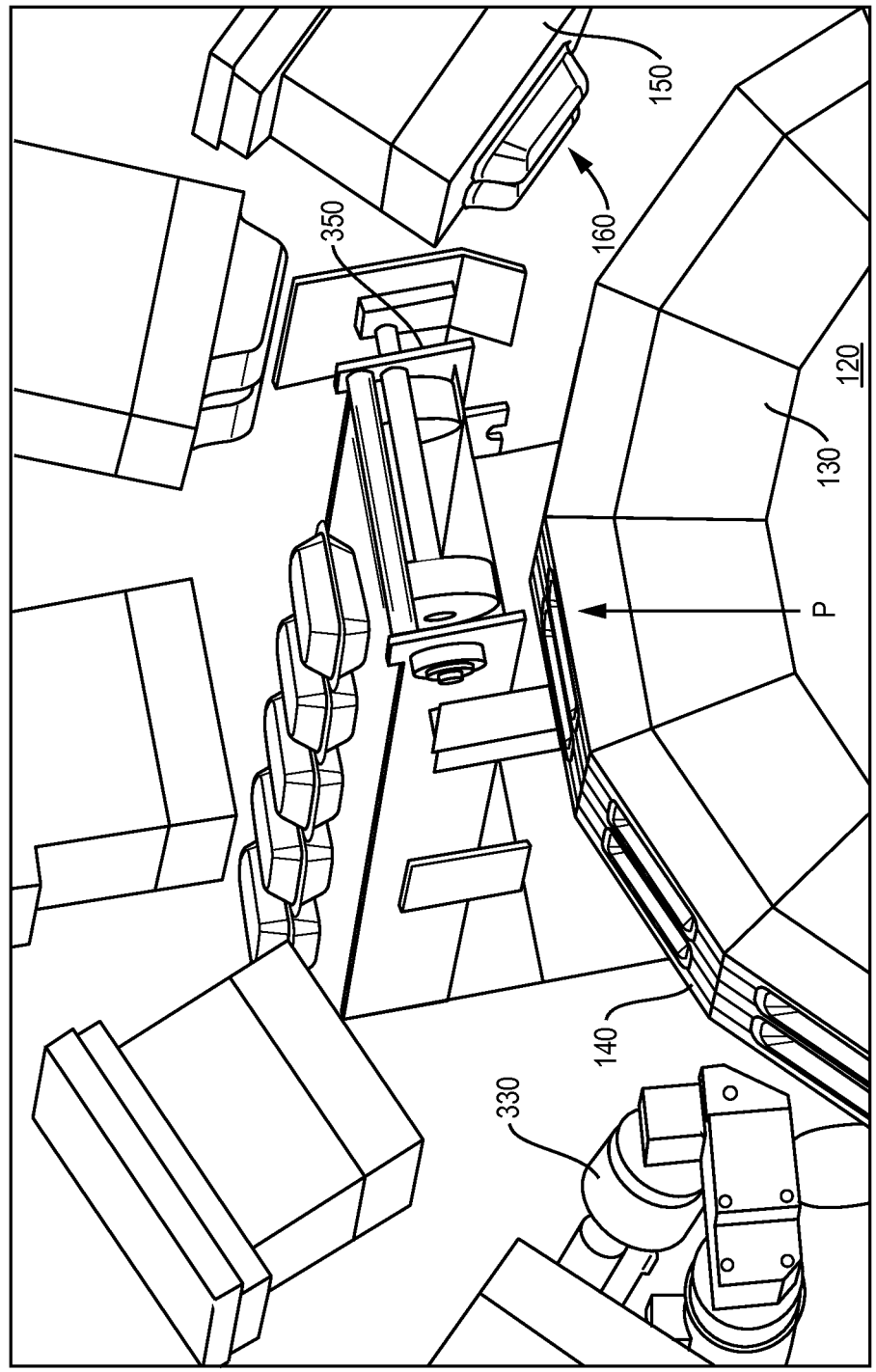
FIG. 4 illustrates an example exploded rear view of the insertion point on the mill-style blow molding wheel.

As such, FIGS. 1-6 are exemplary views of illustrative mills style blow molding wheel of the illustrative embodiment of the present invention. As can be seen from FIGS. 1-2, the blow molding wheel assembly 100 is made up of a plurality of components. FIG. 1 illustrates an example perspective right side view of the mill-style blow molding wheel, FIG. 2 illustrates an example perspective left side view of the mill-style blow molding wheel, and FIG. 3 illustrates an example perspective view of the mill-style blow molding wheel implemented in an illustrative paperboard blow molding manufacturing assembly illustrating the positioning of an extruder and a second molds for operating the illustrative embodiment of the present invention.

In particular, a blow molding assembly 100 in FIGS. 1-3 includes a hub 120 with a plurality of first molds 140 disposed thereon and a plurality of second molds 150 rotating above the first molds 140. The second molds may be rotated by connecting the second molds to plate 175 (e.g., a dial plate) that is fixed to a shaft 110 to synchronize the first molds 140 and second molds 150. The hub 120 is configured to rotate about the shaft 110 in a substantially continuous manner during operation of the mill-style blow mold wheel assembly 100. The plurality of first molds 140 and the plurality of second molds 150 may be configured to receive one or more three-dimensional parts 160 (e.g., paperboard trays or containers) at a particular point during the rotation of the first molds 140 and the second molds 150 which will be discussed below.

As illustratively shown in FIGS. 1-3, the plurality of first molds 140 and the second molds 150 which receive the three-dimensional parts 160 may be disposed in "adjacent pairs" on the hub 120 and the second molds 150. As illustrated, each of the first molds 140 (and 150) are formed substantially in a rectangular shape rather than trapezoidal in order to reduce the amount of plastic waste between the two adjacent pairs. Additionally, since the molds are rectangular, the length of the molds may also be easily adjusted in order to fit smaller or larger three-dimensional parts 160 into the molds. The shape of the molds, however, is not limited to rectangular and can be any shape required for processing of the three dimensional part, e.g. it may be spherical or rounded.

Included on the hub 120 may be a plurality of risers 130. The hub 120 may be disposed between the shaft and the plurality of risers 130. These, risers may be used to increase and decrease the overall size of the wheel and thus their presents is not necessarily required. Thus, the first molds may be attached directly to the hub 120 without departing from the overall embodiment of the present invention.

At the same time, the second molds 150 may be configured to rotate above the first molds via connection to the shaft 110 through for example a dial plate. The second molds 150 in the illustrative embodiment of the present invention may correspond to the plurality of first molds 140 so that there are the same number of first molds as second molds. These second molds 150 (as mentioned above) in the illustrative embodiment of the present invention are disposed above each of the plurality of first molds 140 respectively and are configured to move toward and then away from the first molds depending upon the rotation of the second molds 150.

As can be seen from FIG. 3 in particular, the second molds 150 are not rotated in a symmetrical in shape. Therefore, as the second molds 150 rotate, the second molds 150 move orthogonally toward and away from the first molds 140 depending on where a particular mold is in a rotation cycle of the second molds 150. In doing so, the hub 120 and the second molds 150 rotate substantially in unison, however, so that the first molds 140 and the second molds open and close orthogonally to allow a blow molding process to be performed.

Figure 5:
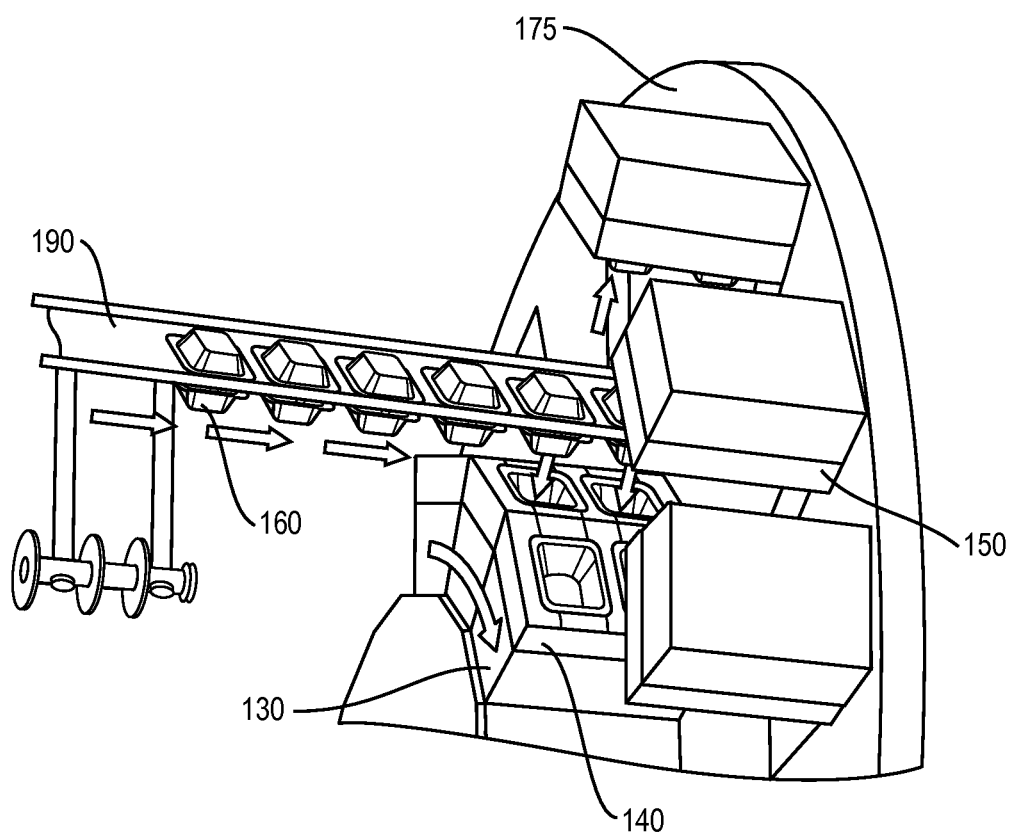
FIG. 5 illustrates an example perspective right side view of the mill-style blow molding wheel.

In particular, with reference to FIGS. 3 and 5 the second molds 150 may be rotated so that as the second molds 150 approach a part insertion point P, the second molds 150 are moved orthogonally away from the first molds 140 so that the first molds 140 and the second molds 150 may receive three-dimensional parts 160 into recesses (e.g., two recesses) 360a and 360b respectively, formed in the first molds 140 and the second molds 150 respectively. At point P in the rotation, the three-dimensional parts are inserted by, for example, applying a suction force to the three-dimensional part 160 which may be delivered on a conveyor 190 between the hub 120 and the second molds 150.

Once the part 160 has been inserted into both the first molds 140 and the second molds 150, the parts 160 are rotated along with the molds 140/150 toward an extruder 330 (FIG. 3), at which point a material (e.g. a multi-layered plastic) is extruded into both the first molds and the second molds. The second molds 150 then begin to move orthogonally toward the corresponding first molds 140 as the first and second mold rotate away from the extruder 330 until the first and second molds 140 and 150 come into contact with each other.

As seen in FIG. 3, the extruder 330 may be disposed between the first molds 140 and the second molds 150 because the second molds 150 are moved orthogonally away from the first molds at this point in the rotation. This extruder 330 may be configured to extrude a material onto the three-dimensional parts 160 in both the first molds 140 and the second molds 150, respectively, from the extruder's position between the first molds 140 and the second molds 150.

As the second molds 150 rotate away from the extruder 330, eventually the second molds 150 will come in contact with the first molds 140. As a result, the second molds 150 will apply a clamping force to hold the first and second molds 140/150 together for a particular rotational period K due to a displacement of the second molds as the second molds rotate (FIG. 2). During this particular rotational period K, a blow molding process may be applied by a blowing mechanism (not shown) to the three-dimensional parts 160 to adhere and form the material extruded onto the three-dimensional part. This process produces a three-dimensional product (i.e., a three-dimensional part with the material applied). These blow molding mechanisms are well known in the art and therefore a description thereof will be omitted for brevity.

Once the molds 140 and 150 have completed a particular rotational period K, the blow molding process should have completed and the second molds 150 then begin to move orthogonally away from a corresponding first mold of the plurality of first molds as the first and second mold approach a removal mechanism 350 for the three-dimensional products (e.g., a conveyor).

In order to retain the three-dimensional parts 160 in the first molds 140 and the second molds 160, a suction mechanism 145 (e.g., a vacuum) may be installed in the first molds 140 and the second molds 150, preferably along a bottom surface thereof. This suction mechanism 145 is configured to retain the three-dimensional product 160 in the molds 140 and 150 during the insertion, extrusion, and blow molding process and to remove a three-dimensional product (i.e., the blow molded product) from the first molds 140 as a corresponding second mold of the plurality of second molds 150 moves away from the first mold by removing the vacuum only the first molds. For instance, once the three-dimensional products reach a position above the removal mechanism 350, a vacuum applied by suction mechanism 145 in the second molds (not shown) may be removed allowing the blow molded three-dimensional products to be removed by the removal mechanism 350 and further processed.

As stated above, because there is minimal restriction regarding the shape of the molds in the illustrative embodiment of the present invention, these molds may be substantially rectangular or spherical/rounded in shape, thus allowing for the three-dimensional product which is produced to be substantially rectangular in shape as well, e.g., rectangular or spherical/rounded paperboard packaging. As a result the blow-molded three-dimensional products that are produced by the present invention may have very little plastic waste between the adjacently produced parts, making the overall process much more efficient.

Figure 6:
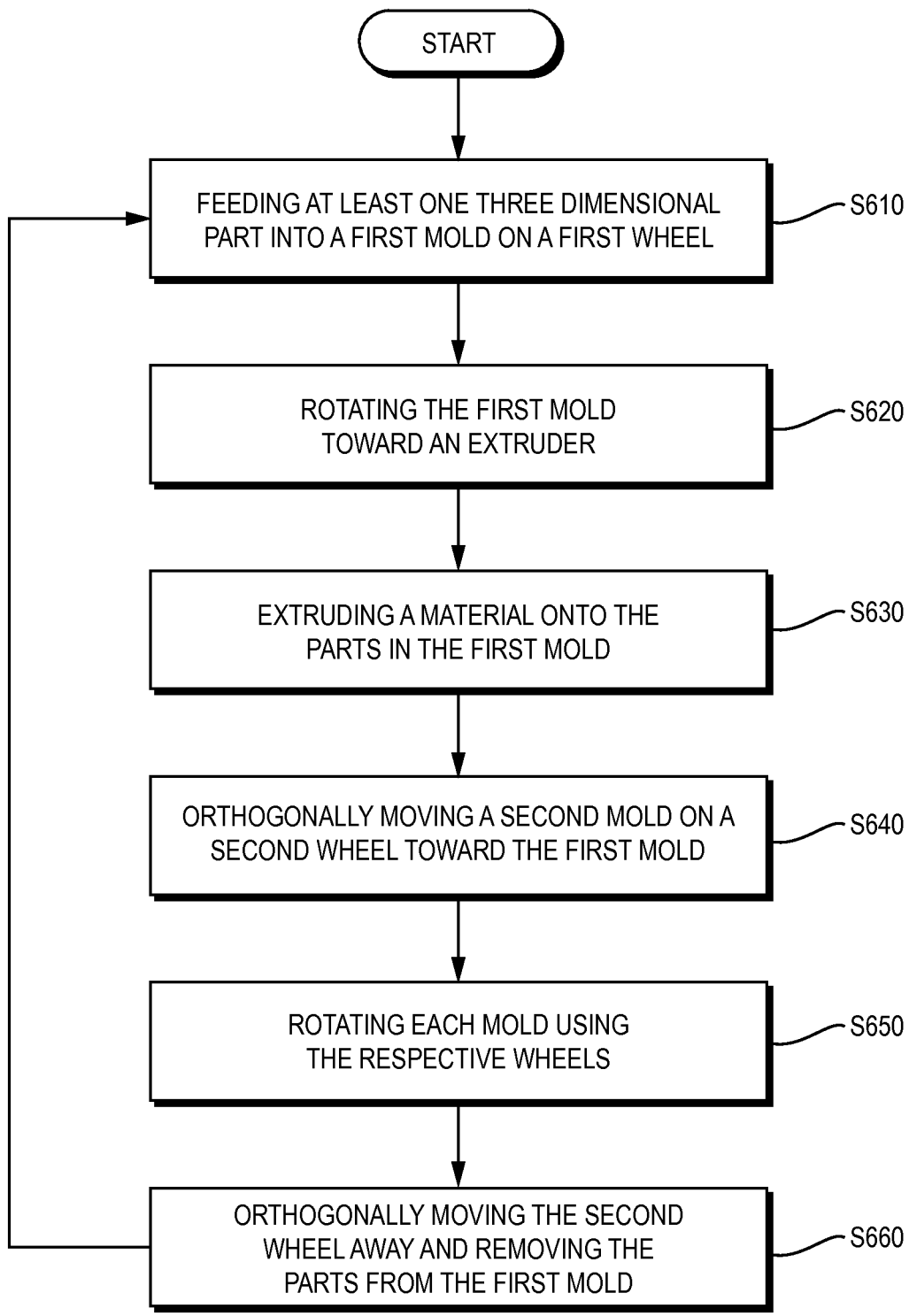
FIG. 6 illustrates an example illustrating a process for manufacturing a three-dimensional part utilizing the mill-style blow molding wheel of the present invention.

As also stated above, the above-described blow molding wheel assembly may be utilized to produce paperboard trays or any other paper blow molded product. FIG. 6 illustrates the above manufacturing process for producing such a product according to an exemplary embodiment of the present invention. In particular, as discussed above, one or more three-dimensional parts are fed into a first mold on an outer circumference of a hub and a second mold of the second molds 150 facing a first mold of the first molds 140 that are rotating around the hub in the same axial direction as the hub in step S610. The first mold and the second mold, including the one or more three-dimensional parts, are then rotated toward an extruder in step S620 and a material is extruded onto the one or more three-dimensional parts that are disposed in the first mold and second mold in step S630. After extrusion, the second molds are orthogonally moved toward the first mold to force the first mold and the second mold to come into contact as the first and second molds rotate in step S640. The first and second molds are then rotated a particular distance K at which time a blow molding process may be applied to adhere and form the material to a surface of the one or more three-dimensional parts in step S650.

During this process, air may be blown toward a first mold by a second mold while the first and second molds are rotating the particular distance. It should be noted, however, that the illustrative embodiment of the present invention is not limited to the direction at which the blow molding process should be applied, and any orientation or blow direction may be applied without departing from the overall concept of the present invention.

In response to rotating a particular distance, the second mold orthogonally moves away from the first mold (due to the rotation of the second molds) and removes the one or more three-dimensional parts from the first mold as a result (e.g., by applying a suction force to the one or more three-dimensional parts) in step S660, and the process repeats rotation back to S610.

More specifically, in some exemplary embodiments, during the above process a suction force may be applied for a particular period of rotation of the second molds to retain the three-dimensional parts in the molds. In particular, during removal, the one or more three-dimensional parts the suction force may be applied to the one or more three-dimensional products by a suction mechanism disposed in the second mold until the one or more three-dimensional parts are ejected from the second mold individually onto a conveyor belt disposed between the hub and the second molds.

It should be noted that while certain steps within operational procedures may be optional as described above, these steps are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while the above operational procedures are described separately, certain steps may occur almost of substantially simultaneously, and the procedures are not meant to be mutually exclusive or necessarily in any particular order unless otherwise specified.

Advantageously, the above-mentioned mills style blow molding wheel increases the accessibility to the molds for insertion and extraction of the three-dimensional parts while at the same time increasing the overall speed of the production process (e.g., 288 parts/min may be produced). Additionally, by utilizing the mills style molds which open and close orthogonally, the molds may be rectangular or spherical/rounded, thereby reducing plastic waste between three-dimensional blow molded parts.

While there have been shown and described illustrative embodiments that provide a blow molding wheel, it is to be understood that various other adaptations and modifications may be made within the spirit and scope of the embodiments herein. For example, the embodiments have been shown and described herein with relation to the feeding and extraction means of both the three-dimensional parts and the material, however, the embodiments in their broader sense are not as limited, and may, in fact, be used with other types of types of feeding means (e.g., arms, alternately orientated conveyors, injection molding, etc.) without departing from the overall spirit of the apparatus and method of operation thereof.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus comprising:
    a hub configured to rotate about a shaft;
    a plurality of first molds formed on the hub, each of the plurality of first molds comprising:
        at least two first mold recesses configured to receive a three-dimensional part; and
        a first mold suction mechanism in each of the at least two first mold recesses;
    a plurality of second molds configured to rotate above each of the plurality of first molds respectively, each of the plurality of second molds comprising:
        at least two second mold recesses configured to receive a three-dimensional part; and
        a second mold suction mechanism in each of the at least two second mold recesses;
    wherein the plurality of second molds are configured to move in unison with the plurality of first molds as hub and the second molds rotate and to move orthogonally towards and away from the first molds as the second molds rotate;
    at least one feeding means configured to deliver a three-dimensional part to each of the plurality of first molds and plurality of second molds wherein the first mold suction mechanisms retain three-dimensional parts in the first mold recesses and the second mold suction mechanisms retain three-dimensional parts in the second mold recesses during at least a partial rotation of the hub; and
    at least one extruder disposed between a first mold of the plurality of first molds and a second mold of the plurality of second molds, wherein the at least one extruder is configured to extrude a material onto a three-dimensional part in the first mold recesses and onto a three-dimensional part in the second mold recesses.

2. The apparatus of claim 1, wherein a second mold of the plurality of second molds moves orthogonally away from a corresponding first mold of the plurality of first molds as the first and second mold approach a removal conveyor.

3. The apparatus of claim 2, wherein the second mold moves orthogonally toward the corresponding first mold as the first and second mold rotate away from an extruder.

4. The apparatus of claim 1, wherein the second molds applies a clamping force to hold the first and second molds together for a particular rotational period due to a rotational displacement of the second molds as the second molds rotate.

5. The apparatus of claim 1, wherein the first and second molds are substantially rectangular or spherical in shape.

6. The apparatus of claim 1, wherein the hub includes a plurality of mold risers disposed between the first plurality of molds and a hub.

7. The apparatus of claim 1, further comprising a blowing mechanism for applying a blow molding process to adhere a product from the one or more extruders to at least one three-dimensional part retained in a first mold recess and in a second mold recess.

8. A method comprising:
    feeding one or more three-dimensional parts into a first mold formed in a hub and a second mold disposed above the first mold;
    rotating the first mold and the second mold including the one or more three-dimensional parts toward an extruder;
    extruding a material onto the one or more three-dimensional parts that are disposed in the first mold and second mold;
    orthogonally moving a second mold toward the first mold after the material has been extruded onto the one or more three-dimensional parts to force the first mold and the second mold to come in contact as the first and second mold rotate;
    rotating the first and second mold a particular distance; and
    in response to rotating a particular distance, moving the second mold orthogonally away from the first mold and removing the one or more three-dimensional parts from the first mold.

9. The method of claim 8, wherein removing the one or more three-dimensional parts includes applying a suction force to the one or more three-dimensional parts by a suction mechanism disposed in the second mold.

10. The method of claim 9, wherein the suction force is applied for a particular period of rotation of the second mold.

11. The method of claim 9, wherein the one or more three-dimensional parts are ejected from the second mold individually onto a conveyor belt disposed between the hub and the second mold.

12. The method of claim 8, wherein the first mold and the second mold rotate in unison.

13. The method of claim 8, wherein the one or more three-dimensional parts are paperboard containers.

14. The method of claim 8, wherein the material is a multi-layered plastic and is applied to the one or more three-dimensional parts by a blow molding processing.

15. The method of claim 8, further comprising blowing air toward a first mold by a second mold while the first and second molds are rotating the particular distance by the first and second molds respectively.

16. The method of claim 8, wherein the one or more three-dimensional parts are rectangular or spherical paperboard packaging.

* * * * *